Dec. 22, 1964  H. L. HARDY  3,162,068
FRICTION WELDER VARIABLE ELECTRONIC TIME CONTROL
Filed May 8, 1962
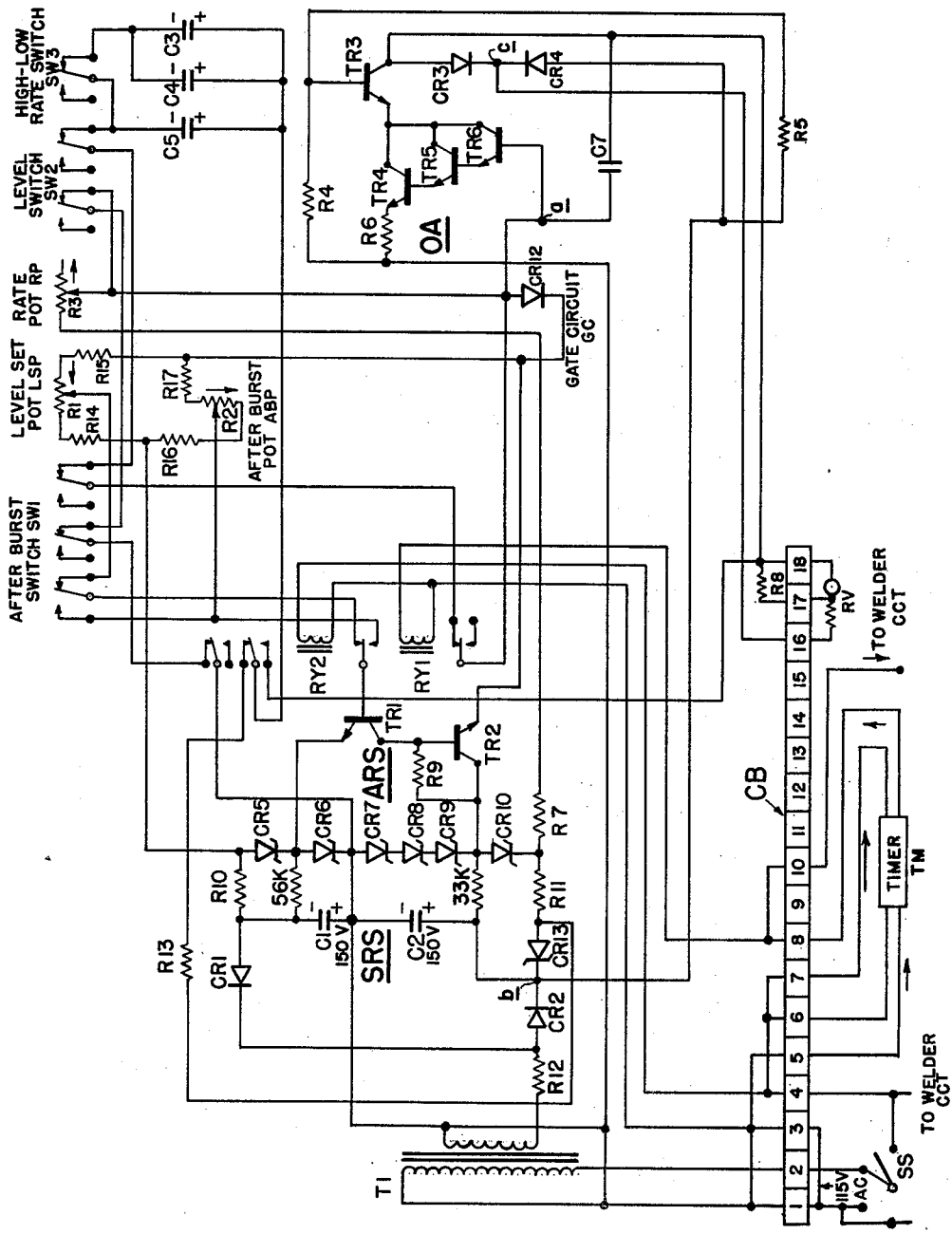
INVENTOR.
HERBERT L. HARDY
BY
ATTORNEY United States Patent Office 3,162,068
Patented Dec. 22, 1964

3,162,068
FRICTION WELDER VARIABLE ELECTRONIC
TIME CONTROL
Herbert L. Hardy, Monroe, Conn., assignor to American
Machine and Foundry Company, a corporation of New
Jersey
Filed May 8, 1962, Ser. No. 193,096
12 Claims. (Cl. 78—82)

The invention relates to electrical control systems and particularly to an electrical variable time control circuit for use in a friction welding system.

Theoretically, friction welding is a process in which the mechanical energy of two objects revolving in contact with one another is converted into thermal energy which is utilized, instead of a separate heating source, to weld the two objects together. In practice, one of the objects is usually held fast while the other is rotated and pressed against the first object. Usually, after a specified period of time, this rotation is stopped and the pressure is increased and held for another specified period. If all the operating conditions are correct for the materials used in the objects involved, whether they be metals, plastics or ceramics, a high quality weld of the two objects is obtained.

It has been found that friction welding of metal objects may be improved by causing the pressure applied to the material to be joined to increase linearly with time, hold a set level for a given time and then assume and hold a higher level until the end of the welding process. The exact program depends upon the material to be welded, as well as the size of the joints. Test results indicate that most joints can be successfully welded by increasing the pressure applied at rates between 333 pounds per second and 4.4 pounds per second. The fixed levels must be variable between 200 and 1000 pounds. It is also required that the time of application of the second pressure level be variable from 2 to 120 seconds.

The invention is particularly adapted for, although not limited to, use with a friction welder operated by a hydraulic system including a solenoid-controlled four-way relief valve for applying the pressure to the sample being welded, disclosed in the French patent of Hollander et al., No. 1,316,375, issued Mar. 6, 1962.

A general object is to program the lateral pressure applied to a sample being welded in a friction welding system in the optimum manner.

Another more specific object is to control the current through the relief valve of a hydraulic system controlling the pressure applied to the material in a friction welder so that it increases linearly with time until a given set level is reached, holds the pressure constant at that level for a predetermined time interval and then assumes and holds the pressure at a desired higher level until the end of the welding process.

A related object is to provide current flow through a hydraulic valve relief coil in a friction welding system which increases linearly with time until a predetermined value is reached, maintains current flow through the coil constant at that value for a predetermined time interval and then increases the current flow to a higher level and holds it constant at that value for a second predetermined time interval.

These objects are attained in accordance with the invention by the provision of a special electrical variable time control unit operated from a primary A.C. power source for controlling the current through the hydraulic relief valve of a friction welding system. The unit operates in two modes, first as an integrator for integrating a step D.C. voltage input to furnish a slowly varying current for the valve operation, and secondly as an adjustable constant current source for furnishing the two set pressure levels for the welding operation. It includes an associated electro-mechanical timer for determining the exact instant of change to the second level, manual controls for adjusting the first and second adjustable levels and a pressure rate control.

These and other features and objects of this invention will be better understood from the following detailed description thereof when read in conjunction with the single figure of the drawing showing the circuit schematic of a variable time control unit embodying the invention.

Referring to the drawing, the variable time control unit illustrated therein comprises five main components which are a semi-regulated power supply SRS, an adjustable regulated power supply ARS, an operational amplifier OA which may be connected in an integrator configuration, a gate circuit GC and a standard electro-mechanical timer TM. The semi-regulated power supply SRS is comprised of both a positive and a negative output half-wave rectifier CR1 and CR2 driving a string of zener reference diodes CR5 to CR10 in series through the resistors R10 and R11. The transformer T1 fed through terminals 1 and 2 of the control box CB with 115 volts A.C. supplies 80 volts A.C. to the rectifiers CR1 and CR2 which give + and − 110 volts D.C. output. The zener diode reference string CR5 to CR10 supplies at different taps thereof −13.2, −6.8, +20.4 and +27.2 volts D.C. to the remainder of the equipment. The stability of the semi-regulated supply SRS is increased by the addition of two resistors 33K and 56K to the positive and negative regulator strings to insure that sufficient current is flowing through the zener diodes under all conditions.

The adjustable power supply ARS is a series-regulated unit with an output variable from 0 to +16 volts D.C. A (2N336) transistor TR2 with its base and collector electrode connected by a resistor R9 is used as the series regulating element, while a second (2N336) transistor TR1 is used as a control amplifier. This supply is referenced to −13.2 volts and is supplied from the +20.4 and −6.8 volt D.C. taps of the zener diode reference string. Since the output impedance is designed to be under 100 ohms, the supply approximates an ideal voltage source for the gate circuit GC comprising the diode gate rectifier CR12 connected in series between the emitter electrode of transistor TR2 in the ARS supply and the summing input $a$ of the operational amplifier OA.

The output amplifier OA contains four direct coupled transistors. The input stage, two series-connected grounded collector (2N699) transistors TR5 and TR6, is connected to a common emitter (2N341) transistor TR4. This three-transistor combination may be considered as a Darlington-connected composite transistor and analyzed as a single transistor. The Darlington stage has a current feedback resistor R6 in the emitter leg of the transistor TR4 to provide increased stability and linearity, as well as a function in the gating action.

The composite stage TR4, TR5 and TR6 is coupled to a grounded base output stage, the second (2N341) transistor TR3. A condenser C7 is connected from the collector of transistor TR3 to the summing junction $a$ of the amplifier OA. A resistor R4 is connected in series with the current feedback resistor R6 from the base of transistor TR3 to the emitter of the transistor TR4. Proper selection of the base impedance, as well as the bias level of the grounded base transistor TR3 results in an equal division of the voltage applied across the combination of transistors at all collector current levels. This voltage division is required because the supply voltage is 95 volts and the emitter-to-collector breakdown voltage of the transistors TR3 and TR4 is 60 volts. The arrangement of transistors described comprises an operational amplifier OA with a single ended output. This amplifier can deliver an output of from 0 to 120 volts into a 7000 ohm load. The resistors R3 and R7 and capacitors C3, C4 and C5, when connected to the input and output of the amplifier OA, respectively, comprise an RC network converting the amplifier into an operational integrator.

The gate circuit GC is comprised of the diode CR12 which does not conduct when back biased. When forward bias is applied thereto, the diode CR12 will act as a short circuit connecting the summing junction $a$ of the operational amplifier OA to the adjustable regulated supply ARS.

There are three groups of manual controls for the variable time control unit as shown in the drawing. The first group is the high-low rate switch SW3 and the rate resistance potentiometer RP. They adjust the slope of the increase in pressure. The switch SW3 is a coarse adjustment which sets the range of the slope. The low position allows control from 4.4 pounds per second to 44 pounds per second, while the high position allows control from 34 pounds per second to 340 pounds per second. The exact rate is determined by the settings of the rate potentiometer RP. The switch SW3 is arranged to control the integrating capacitors C3 through C5 of the RC network so as to vary the amount of capacitance connected in the output of the operational amplifier OA. The resistor R3 of the rate potentiometer RP and the resistor R7 forming the resistance of that network are connected in series between the summing junction $a$ of the amplifier OA and the +27.2 volt D.C. tap $b$ of the zener diode string of the semi-regulated power supply SRS.

The second group of controls, the level switch SW2 and the level set resistance potentiometer LSP set the intermediate pressure level. The switch SW2 acts as an override of the timing functions and allows the level to be set with the level potentiometer LP. The level is adjustable from 4.4 pounds to 1000 pounds. The level set switch SW2 disconnects the timing capacitors C3, C4 and C5 to allow manual adjustment of the intermediate pressure level. The level set potentiometer LSP is connected through normally made contacts of the relay RY1 between the base of the transistor TR1 in the regulated power supply ARS and the gating rectifier CR12.

The third group of adjustable manual controls, the afterburst switch SW1 and the afterburst resistance potentiometer ABP set the final pressure level. They function identically to the level controls and have the same range. The afterburst switch SW1 and the afterburst potentiometer ABP are connected through normally open contacts of the unenergized relay RY1 between the output of adjustable regulated power supply ARS and the gate diode CR12.

The interconnections of the 115 volts A.C. power source, the start switch SS, the electro-mechanical timer TM, the start relay RY2, the external relay RY1 and the relief valve RV to the circuit just described are made through the terminals of the control box CB. The terminals 1 and 2 of control box CB connects 115 volts A.C. to the primary winding of transformer T1. The start switch SS is connected between terminals 2 and 4 of the control box CB. The terminals 3 and 4 of control box CB connect 115 volts A.C. power to the winding of start relay RY2 when the start switch SS is closed. The terminals 5 and 6 of the control box CB connect the input of electro-mechanical timer TM, which are the terminals of a time delay relay (not shown) to the leads connected to the winding of start relay RY2, so as to supply 115 A.C. power to that timer to start it into operation for conditions of afterburst, when the start switch SS is closed. Terminals 7 and 8 of the control box CB connect the output of timer TM, which are contacts normally open when the timer TM is running, in series with the leads supplying operating current to the external relay RY1, so that when these contacts are closed at the end of a predetermined time interval, the external relay RY1 will be operatively energized from the 115 volt A.C. source through operated switch SS. An additional lead through terminal 10 of the control box CB to a supply lead of relay RY1 goes to the welder circuit and serves through connections (not shown) to open the clutch and apply the brake thereto when the contacts of the timer TM are closed at the end of the timed interval. Terminals 16, 17 and 18 of control box CB connect the four-wave relief valve RV in the hydraulic torque motor controlling the pressure applied to the material being welded in the friction welder to the output of the operational amplifier OA.

The oppositely-poled rectifiers CR3 and CR4 are connected across the output of amplifier OA and connected in series from the collector electrode of transistor TR3 to the point $b$ in the semi-regulated power supply SRS. The midpoint $c$ between rectifiers CR3 and CR4 is connected through terminal 16 of the control box CB to the relief valve RV and will prevent any back E.M.F. generated by the valve RV from affecting the operation of the amplifier OA.

*Circuit Operation*

The complete operation of the variable control unit shown in the drawing will not be described.

It is assumed that the switches and the potentiometers in the three groups of manual controls are adjusted to control the pressures applied by the valve RV depending upon the material being welded and the size of the joints. 115 A.C power is applied by a master switch (not shown) through terminals 1 and 2 of the control box CB to the transformer T1 and will cause in the manner previously described a D.C. voltage of +27.2, +20.4, −6.8 and −13.2 volts D.C. to be produced at the various taps of the zener diode reference string C5 to C10 in the semi-regulated power supply SRS. The start relay RY2 is normally unenergized so that the upper contacts of the relay are closed shorting the base of the transistor TR6 in the operational amplifier OA to negative so that the amplifier OA will not conduct to cause current to be supplied to the solenoid of valve RV.

Because the valve RV has an initial dead zone and requires 1.1 milliamperes of current through its coils before the valve begins to move, this initial value of current is determined by pre-charging the integrating capacitors C3 to C5 to 80 volts D.C. The 80 volts D.C. is obtained from the 95 volt power supply by a voltage divider using the 15 v. zener diode CR13, which is connected between the resistor R11 and the point $b$ in the semi-regulated power supply SRS, by a connection through the resistance R13 and the closed middle contacts of the unenergized start relay RY2. When the start switch SS connected between the terminals 2 and 4 of the control box CB is closed, the relay RY2 will be energized from the 115 volt A.C. source to open its upper relay contacts to remove the short to the base of the transistor TR6 in the operational amplifier OA. The operation of relay RY2 will close its lower contacts to connect the pre-charged condenser bank C3 to C5 to the output of the operational amplifier OA. When start switch CC is closed, 115 A.C. volts are also supplied through the terminals 5, 6 and 7 of the control box CB to the input of the electromechanical timer TM to start it into operation, and the welding cycle to begin. The A.C. input to the timer TM through terminal 7 of CB is only applied when the start switch SS is closed, thereby only allowing an input from the timer to the welding control circuit through terminal 10 of CA during the timing cycle. The output terminals of the timer TM constitute a single pole, single throw, normally-open switch which is actuated by the timer when it times out to energize control relay RY1. The closing of the start switch SS over connections (not shown) will also open the hydraulic four-way valve RV and force its spindle forward to synchronize the operation of the variable control circuit with that of the welder circuit.

A step D.C. voltage of +27.2 volts D.C. from the voltage tap on the zener diode string C5 to C10 is applied to the input of the operational amplifier OA through the resistor R7 and the resistor R3 of the rate potentiometer RP in series. (The integrating time constant of the amplifier OA is determined by the resistance and capacitance of the RC network.) The amplifier's output voltage will rise linearly with time to +120 volts output due to the charging of the capacitors in the network RC through the operated amplifier OA to a value determined by the value of the applied step voltage and the capacitance values of the capacitors. The step voltage input is integrated with respect to time in the combinational integrator producing a linear voltage rise. This will cause a slowly increasing current to be applied to the valve solenoid RV for the valve operation.

When the output level of the amplifier OA reaches the first pre-set level determined by the setting of the second group of manual controls, the level set switch SW2 and the level set potentiometer LSP, the second mode of operation starts. As the output level of the amplifier OA is rising, the voltage at the base of the transistor TR6 is also rising. The potential of the emitter junction of the transistor TR6 is determined by the current through the emitter feedback resistor R6 and the base voltage follows the emitter voltage. The base voltage will continue to rise until it forward-biases the gate diode CR12 causing that diode to act as a short circuit connecting the summing junction $a$ of the operational amplifier OA to the emitter of transistor TR2 of the adjustable regulated power supply ARS. The amplifier OA is clamped to a plateau determined by the D.C. regulation of transistors TR1 and TR2. The amplifier circuit now appears as a current regulator with a reference source applied between ground and input, the emitter feedback resistor R6 acting as a current sensing resistor. The output voltage of amplifier OA and thus the output current of the operational amplifier OA applied to the relief valve RV will be maintained constant at that level for a predetermined time interval when the mechanical timer TM times out to close a normally open contact connected through terminals 7 and 8 of the control box CB. This causes the external relay RY1 through contacts 4 and 8 of the control box CB to be energized from the 115 volt A.C. source. The energized relay RY1 opens its normally closed lower contacts to remove the capacitor bank C3 to C5 from the output of the amplifier OA. The capacitor C7 is permanently connected across the input-output of the amplifier OA to minimize the switch hash occasioned by this opening of contacts and to smooth out the transition to the second power level which is applied by the closing of the contacts of operated relay RY1 to connect the D.C. amplifier input transistor TR1 in the adjustable regulated power supply ARS to the afterburst potentiometer ABP. This causes the operational amplifier OA to assume the new afterburst power level determined by the setting of the afterburst potentiometer ABP. The C7, R3 time constant integrates this abrupt level step by five milliseconds. The output voltage of amplifier OA and thus the output current of amplifier OA applied to the relief valve RV remains constant at this level until the end of the welding cycle when the start switch SS is opened to disconnect power from the variable time control unit.

Various modifications of the variable time control circuit which has been illustrated and described which are within the spirit and scope of the invention will occur to persons skilled in the art.

What is claimed is:

1. In combination with a friction welder including a current-responsive pressure control device, a variable time control circuit for supplying to said device a series of selected direct current voltages to provide optimum pressure operation of the welder during each welding cycle, said circuit including a starting switch, an A.C. power source, a semi-regulated D.C. power supply controlled from said source, an adjustable regulated D.C. power supply controlled from said A.C. source, an amplifier having said control device in its output so that it is responsive to the amplifier output current, said amplifier normally including circuits for converting it into an operational integrator, means to derive a step D.C. voltage of predetermined value from said semi-regulated power supply, a plurality of adjustable resistance means of different predetermined values, means responsive to the actuation of said starting switch for causing said step voltage to be applied through one of said adjustable resistance means and said amplifier to cause the amplifier output voltage applied to said control device to rise linearly with respect to time up to a given amplifier output voltage, and gating means responsive to said given amplifier output voltage to shift the connection of the input of said amplifier to the output of said adjustable regulated D.C. power supply through a second adjustable resistance means to cause the output voltage of said amplifier, and thus the operating current applied to said control device, to be held constant at a predetermined amplitude level required at another point in the optimum welding cycle.

2. In combination with a friction welder including a current-responsive pressure control device, a variable time control circuit for supplying to said device a series of selected direct current voltages to provide optimum pressure operation of the welder during each welding cycle, said circuit including a starting switch, a source of A.C. power, an adjustable regulated D.C. power supply controlled from said A.C. source, an amplifier normally including resistors in its input and capacitors in its output forming a RC circuit for converting the amplifier into an operational integrator, said amplifier having said control device in its output so as to be responsive to the amplifier output current, a plurality of adjustable resistance means of predetermined different values, means responsive to the actuation of said starting switch for connecting the input of said amplifier to the output of said adjustable regulated D.C. supply through one of said adjustable resistance means so as to provide in the output of said amplifier operating as an integrator a constant current of a given amplitude level which is supplied to said control device, required at one point in an optimum welding cycle, and timer means brought into action by the actuation of said starting switch and responsive at the end of a predetermined time interval to disconnect the capacitors from the output of said amplifier and cause its operation as an ordinary amplifier from the output of the adjustable regulated D.C. supply through a second one of said adjustable resistance means to supply to said control device a constant current at the amplitude level required at another point in the optimum welding cycle.

3. In combination with a friction welder including a current-responsive hydraulic relief valve for applying pressure to the material being welded, a variable time control circuit comprising starting means including a start switch, a source of A.C. power, a timer controlled from said source; an amplifier having said valve included in its output so as to be responsive to the amplifier output current, a RC network including resistors connected in series with the input of the amplifier and capacitors adapted to be connected across the output thereof for converting the amplifier into an operational integrator, a semi-regulated D.C. power supply controlled from said A.C. power source, an adjustable regulated D.C. power supply controlled from said semi-regulated supply, three groups of manual controls each including a different adjustable potentiometer for adjusting the amount of resistance in the input of said amplifier, means to derive from said semi-regulated supply and apply to the input of said amplifier through the potentiometer of one group of said manual controls adjusted to control the slope of the increase in pressure required by said valve in the first stage of the welding cycle, a step voltage input of a predetermined value to charge said capacitors through said amplifier so as to cause its output voltage, and thus its output current through said valve, to rise linearly with time up to a given output voltage, a gating device responsive to said given output voltage to shift the connection of the input of said amplifier from the output of said semi-regulated supply to the output of said adjustable regulated supply through said gating device and the potentiometer of said second group of manual controls set to an intermediate pressure level, to cause the output voltage of said amplifier, and thus the current through said valve, to be held constant at said intermediate level for a predetermined time interval determined by said timer set into action at the start of the welding cycle, and means at the end of said interval for connecting the output of said adjustable regulated power supply through the potentiometer of the third group of said manual controls adjusted to a final higher pressure level, and for disconnecting said capacitors from the output of said amplifier, causing said amplifier to assume and hold constant its output voltage, and thus the current through said valve, at said final higher pressure level until the end of the welding cycle.

4. The combination of claim 3, in which said semi-regulated power supply includes a string of zener diode reference elements connected in series driven through oppositely-poled half-wave rectifiers and a power transformer by said source of A.C. power to supply the step voltage of said predetermined value at one of the voltage taps along said zener diode string; and said adjustable regulated D.C. power supply comprises two transistors each having base, emitter and collector electrodes, one of which is used as a series regulating element and having its base connected to the collector electrode of the other transistor used as a control amplifier, the collector of said one transistor and the emitter electrode of said other transistor being connected to different voltage taps of said zener diode string in said semi-regulated power supply to provide the desired reference output voltage.

5. The combination of claim 3, in which said output amplifier includes four direct coupled transistors each having a base, emitter and collector electrode, of which the input stage comprises two series-connected grounded collector transistors coupled to a common emitter transistor, this stage having a current feedback transistor in the emitter leg of the common emitter transistor to provide increased stability and linearity, as well as a function in the gating action, this three transistor combination being coupled to a grounded base transistor serving as the output stage of said amplifier, the output of the amplifier and the collector of the output stage transistor being capacity-coupled to the input of the amplifier and the base of the first of said series-connected grounded collector transistor in said input stage, the base of the output stage transistor being connected to the common emitter transistor in said input stage through said current feedback resistor.

6. The combination of claim 3, in which said gating device comprises a diode which is normally back-biased so as not to conduct but when forward bias is applied thereto through the feedback of the output voltage of said amplifier acting as an integrator, said diode will act as a short-circuit to connect the summing junction or input of said amplifier to the output of said adjustable regulated D.C. power supply.

7. The combination of claim 3, in which two oppositely-poled rectifiers in series are connected across the output of said amplifier to prevent any back electromotive force generated by said relief valve from affecting the operation of said amplifier.

8. The combination of claim 3, in which said one group of manual controls comprise a high-low rate switch setting the range of slope of increase in pressure which in the low position varies the capacitance of said RC network to allow pressure control of said valve from substantially 4.4 pounds to 44 pounds per second and in the high position allows its control from substantially 34 to 340 pounds per second, and a rate potentiometer which by its resistance setting determines the exact rate of control; said second group of manual controls comprises a level set switch acting as an override of the timing functions, and a level set potentiometer the resistance of which is adjustable from substantially 4.4 to 1000 pounds to set the intermediate pressure level of said valve; and said third set of adjustable manual controls comprises and afterburst switch and an afterburst potentiometer setting the final higher pressure level of said valve which function identically to the second group of level controls and have the same range of adjustment.

9. The combination of claim 3, in which said capacitors are given a preliminary charge before they are connected across the output of said amplifier to convert it into an operational integrator, to provide the required amount of current through said valve before it begins to apply pressure to the material being welded, and in which said starting means includes relay means operating to switch the charged capacitors across the output of said amplifier at the beginning of the welding cycle.

10. The combination of claim 3, in which said means to apply the step voltage of predetermined value to the input of said amplifier connected to operate as an integrator comprises start relay means which is operatively energized from the A.C. power source when said start switch is closed at the beginning of the welding cycle of said friction welding system and is deenergized by the opening of said switch at the end of the welding cycle, the closing of said start switch also causing A.C. power from said source to be applied to the input of said timer to start its timing action to determine the exact instant of change to the second pressure level, and means for connecting the input of the amplifier to the output of the adjustable regulated power supply through the third group of controls setting the second pressure level and disconnecting the capacitors in said network from the output of said amplifier comprises a second relay means which is operatively energized from the A.C. power source when the timer times out at the end of the predetermined time interval.

11. In combination with a friction welder including a current-responsive hydraulic relief valve for controlling the pressure applied to the material being welded, a semi-regulated power supply including zener diode means providing different direct current potentials at different taps thereon, an adjustable regulated power supply including a series transistor operating as a series-regulating element connected across different direct current voltage taps on said zener diode means, an amplifier including a plurality of series-connected transistors and having said relief valve connected in its output, a capacitive coupling between the output and input of said amplifier, an RC network including resistors in the input of said amplifier and capacitors connected across the output thereof for converting said amplifier to an operational integrator, means for deriving from one of the taps on said zener diode means and applying to the input of said amplifier a step voltage of predetermined value to cause its output voltage, and thus the output current through said relief valve, to rise linearly with time up to a given pre-set output level, gating means responsive to the output level of said amplifier through said capacitive coupling to shift the input of said amplifier from its connection to the output of said semi-regulated power supply to the output of said adjustable regulated power supply to cause the output voltage of said amplifier, and thus the output current through said relief valve, to be maintained constant at an intermediate power level for a given interval of time, and means operative at the end of said time interval to cause said capacitors to be disconnected from the output of said amplifier so as to cause its output voltage, and thus its output current through said valve, to be maintained constant at a third pressure level until the end of the welding process, and adjustable resistance means in the connections to said amplifier for its three operating conditions for controlling the amount of said pre-set level, said intermediate power level and said third pressure level during the welding operation.

12. The combination of claim 11, in which said interval of time for which said output voltage of said amplifier is maintained constant at said intermediate power level is provided by a timer which is set into action at the time said step voltage input to said amplifier is derived.

References Cited in the file of this patent

UNITED STATES PATENTS

| | | |
|---|---|---|
| 2,363,753 | Smith | Nov. 28, 1944 |
| 2,933,428 | Mueller | Apr. 19, 1960 |